(12) United States Patent
Marchand et al.

(10) Patent No.: US 11,415,488 B2
(45) Date of Patent: Aug. 16, 2022

(54) ACCESS PORT FOR A FLUID SYSTEM

(71) Applicant: Bay6 Solutions Inc., St. Albert (CA)

(72) Inventors: Roger L Marchand, St. Albert (CA); Douglas J Tschetter, St. Albert (CA)

(73) Assignee: BAY6 SOLUTIONS INC., St. Albert (CA)

( * ) Notice: Subject to any disclaimer, the term of this patent is extended or adjusted under 35 U.S.C. 154(b) by 213 days.

(21) Appl. No.: 16/159,946

(22) Filed: Oct. 15, 2018

(65) Prior Publication Data

US 2019/0120731 A1    Apr. 25, 2019

Related U.S. Application Data

(60) Provisional application No. 62/575,210, filed on Oct. 20, 2017.

(51) Int. Cl.
*G01N 1/20* (2006.01)
*F01M 11/04* (2006.01)
*G01N 1/10* (2006.01)

(52) U.S. Cl.
CPC ....... *G01N 1/2035* (2013.01); *F01M 11/0408* (2013.01); *G01N 2001/1037* (2013.01); *G01N 2001/205* (2013.01)

(58) Field of Classification Search
CPC ......... G01N 1/2035; G01N 2001/1037; G01N 2001/205; G01N 2001/105; G01N 1/2226; G01N 2001/2285; G01N 2001/2291; F01M 11/0408
USPC ............. 73/66.5, 61.42, 114.55, 756, 863.86
See application file for complete search history.

(56) References Cited

U.S. PATENT DOCUMENTS

| 1,806,001 | A | * | 5/1931 | Simms | .................... | B03C 1/28 |
| | | | | | | 210/222 |
| 3,955,648 | A | * | 5/1976 | Walker, Jr. | .............. | B60R 17/00 |
| | | | | | | 184/105.3 |
| 4,005,847 | A | * | 2/1977 | Ekman | .................... | F16L 37/23 |
| | | | | | | 251/148 |

(Continued)

FOREIGN PATENT DOCUMENTS

FR    2809335 A1    11/2001

OTHER PUBLICATIONS

Hydraulic System Products Limited webpage "www.h-s-p.co.uk/71-Fluid-Sampling-Probes" obtained Jan. 26, 2017.

*Primary Examiner* — Robert R Raevis
(74) *Attorney, Agent, or Firm* — Finch & Maloney PLLC; Jay S. Franklin; Michael J. Bujold

(57) ABSTRACT

An access port for a fluid system having a sidewall defining a fluid cavity is provided. A probe receiver, having an inner passage with a valve seat and a chamber adjacent to the valve seat and in fluid communication with the inner passage, is connected to the sidewall of the fluid system. The chamber has an opening in communication with the fluid cavity and a valve member biased to a seated position that moves within the chamber to an unseated position. A probe is connected to the probe receiver and extends through the inner fluid passage of the probe receiver into the chamber. When the probe body is inserted into the probe receiver it moves the valve member to the unseated position and the valve member and a portion of the probe body traverse the opening. When the probe body is removed, the valve member returns to the seated position.

8 Claims, 10 Drawing Sheets

(56) References Cited

U.S. PATENT DOCUMENTS

| | | | |
|---|---|---|---|
| 4,051,731 A | | 10/1977 | Bohl et al. |
| 4,320,343 A | | 3/1982 | Ingram |
| 4,598,581 A | * | 7/1986 | Brekke ............... G01L 19/0007 |
| | | | 374/145 |
| 4,848,463 A | | 7/1989 | Ringgenberg et al. |
| 4,883,591 A | | 11/1989 | Belasco |
| 4,901,761 A | | 2/1990 | Taylor |
| 4,940,209 A | * | 7/1990 | Fish ................... F01M 11/0408 |
| | | | 123/196 R |
| 5,048,578 A | * | 9/1991 | Dorf .................. F01M 11/0408 |
| | | | 141/346 |
| 5,540,089 A | | 7/1996 | Fitch |
| 5,878,798 A | | 3/1999 | Harris et al. |
| 5,882,514 A | | 3/1999 | Fletcher |
| 6,126,142 A | * | 10/2000 | Wolf .................. F01M 11/0408 |
| | | | 251/149.6 |
| 6,143,171 A | | 11/2000 | Van Aarsen |
| 6,206,344 B1 | * | 3/2001 | Takahara ........... F01M 11/0408 |
| | | | 137/590 |
| 6,558,541 B1 | | 5/2003 | Morrison |
| 6,581,634 B2 | | 6/2003 | Najmolhoda et al. |
| 6,706,178 B2 | | 3/2004 | Simonson |
| 6,892,999 B2 | | 5/2005 | Hall et al. |
| 7,617,745 B1 | | 11/2009 | Mayeaux |
| 7,823,633 B2 | | 11/2010 | Hartwell |
| 8,845,893 B2 | | 9/2014 | Marchand et al. |
| 9,517,473 B2 | | 12/2016 | Marchand et al. |
| 9,752,473 B1 | * | 9/2017 | Burns ................. F01M 11/0408 |
| 2003/0089874 A1 | * | 5/2003 | Hall .................... G01N 1/2035 |
| | | | 251/149.6 |
| 2009/0100947 A1 | | 4/2009 | Page |
| 2015/0355076 A1 | | 12/2015 | Eaton et al. |

\* cited by examiner

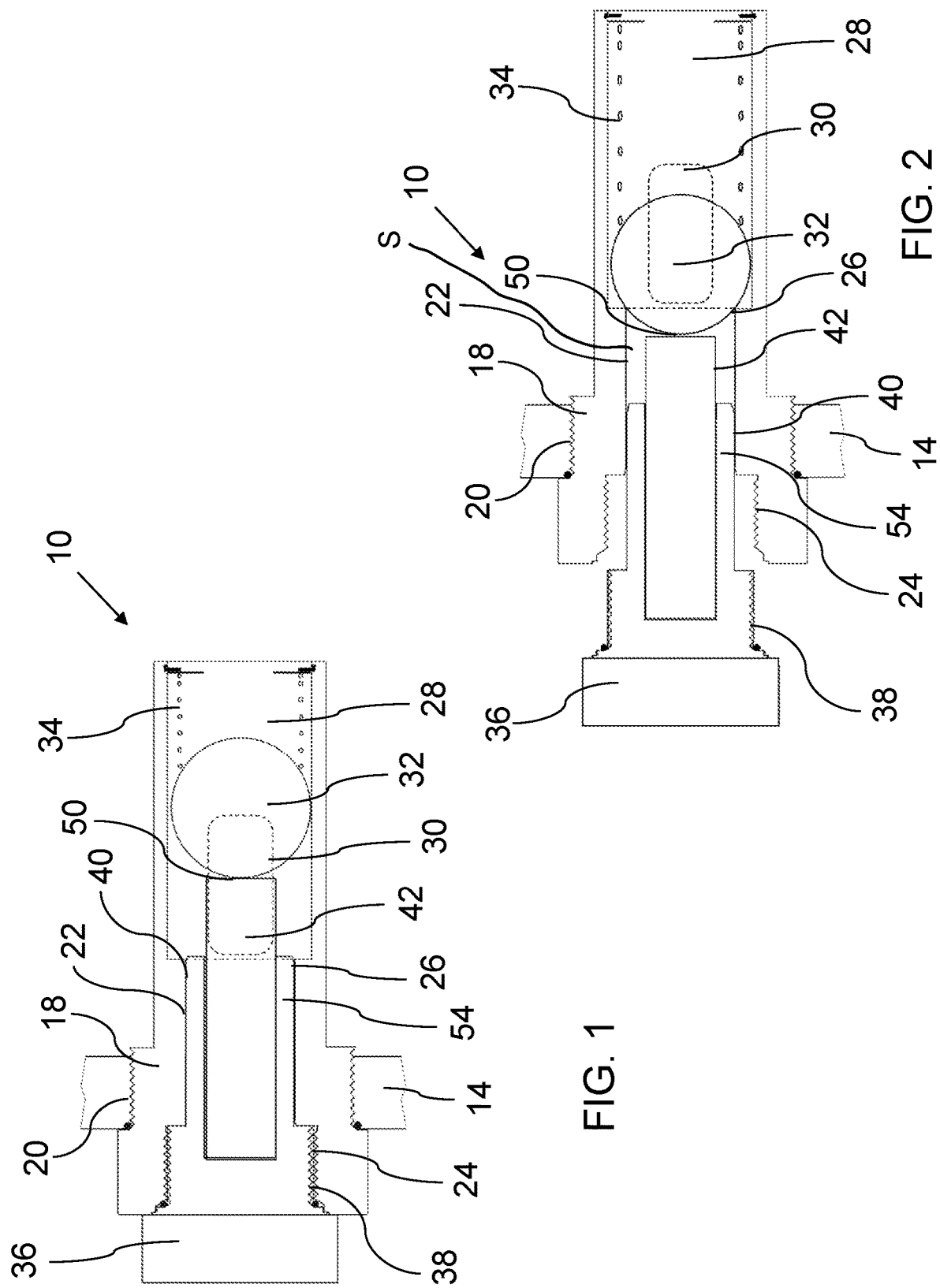

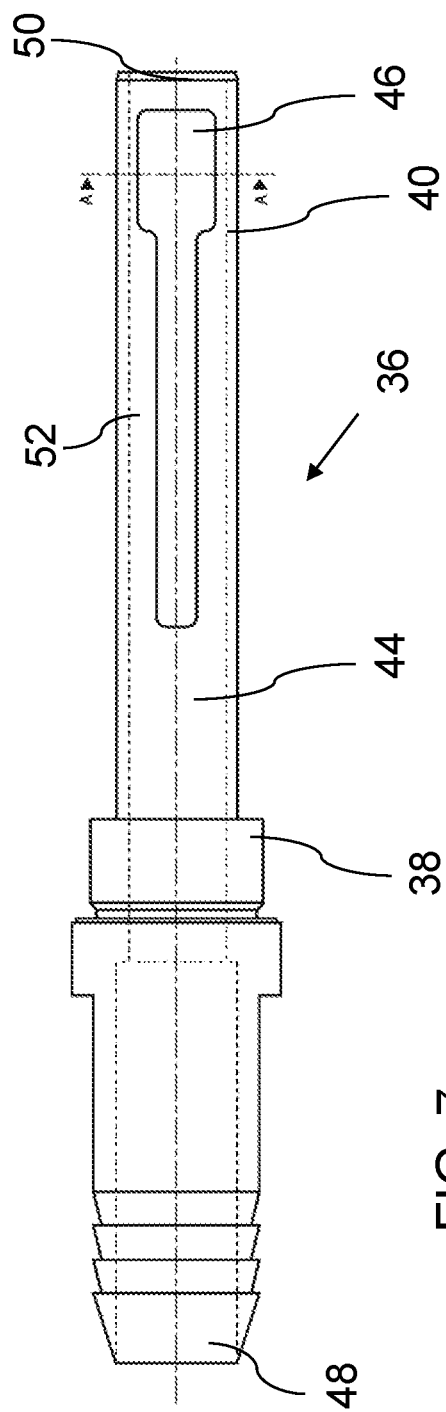
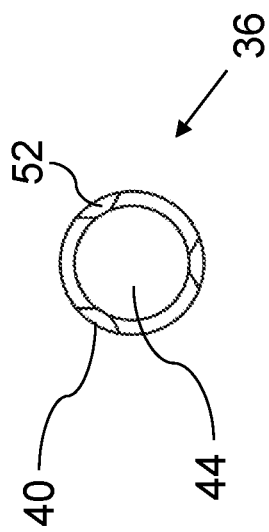
FIG. 7
FIG. 8

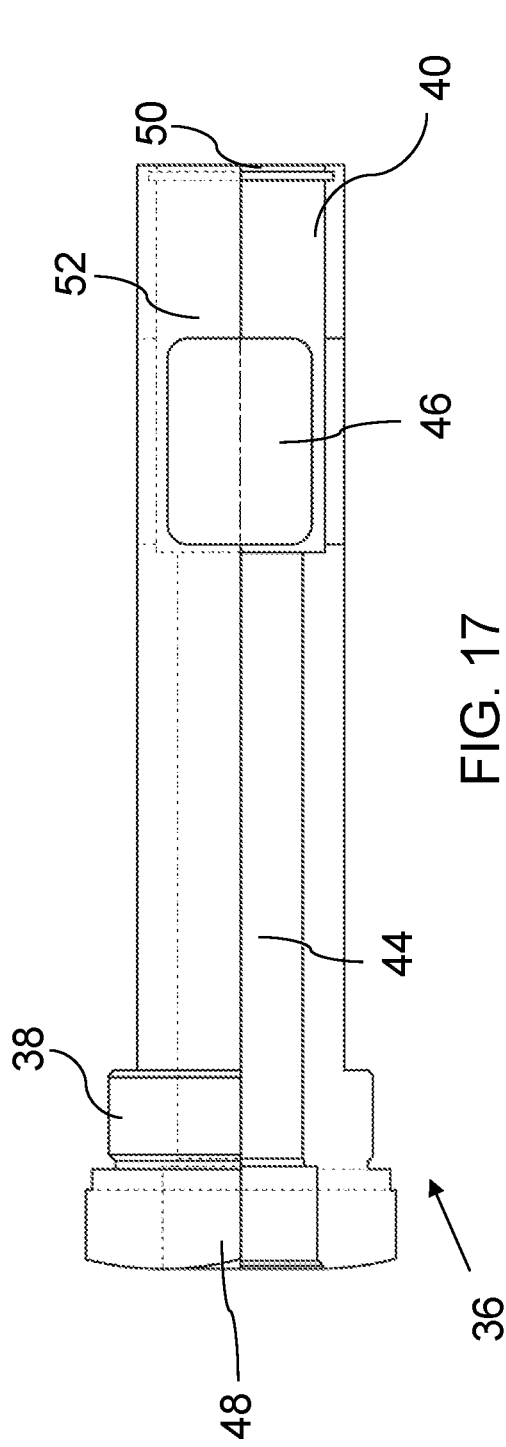
FIG. 17
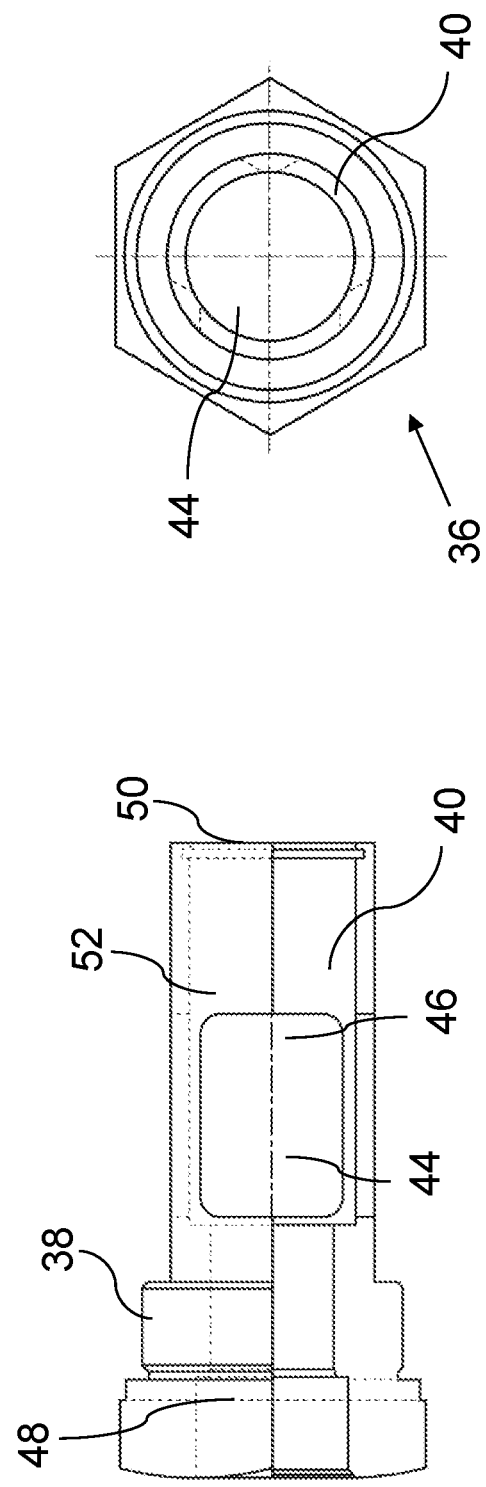
FIG. 19
FIG. 18

ACCESS PORT FOR A FLUID SYSTEM

TECHNICAL FIELD

This relates to a access port for a fluid system, such as a hydraulic fluid system in industrial equipment or other mechanical machinery.

BACKGROUND

Industrial equipment that are lubricated and cooled by hydraulic fluid generally have hydraulic fluid reservoirs and component fluid ports. The industrial equipment may be monitored by regularly testing these fluids. For example, the presence of ferrous metal in the fluid may be indicative of a condition that requires servicing. U.S. Pat. No. 6,558,541 (Morrison) entitled "Contaminant Capture Device and Method for Use" is an example of a device that may be used to detect the presence of metal particles or chips in the fluid.

SUMMARY

According to an aspect, there is provided an access port for a fluid system, the fluid system having a sidewall that defines a fluid cavity, the access port comprising a probe receiver comprising an outer connection that, in use, connects the probe receiver to the sidewall of the fluid system, an inner passage that extends through the outer connection, the inner passage having an internal connection at a first end and a valve seat at a second end, a chamber adjacent to the valve seat and in fluid communication with the inner passage, the chamber comprising a fluid opening that is in fluid communication with the fluid cavity of the fluid system, a valve member that is movable within the chamber between an unseated position away from the valve seat and a seated position against the valve seat, the valve member being biased toward the seated position, and a probe comprising an external connection shaped to sealably and releasably engage the internal connection of the probe receiver, and a probe body that extends away from the external connection, the probe body being sized to extend through the inner fluid passage of the probe receiver and into the chamber, wherein when the probe body is inserted into the probe receiver, the probe body moves the valve member toward the unseated position such that the valve member and a portion of the probe body traverses at least a portion of the fluid opening, and when the probe body is removed from the probe receiver, the valve member moves to the seated position.

In other aspects, the access port may include one or more of the following aspects: the probe body may comprise a magnetic element at least a portion of the magnetic element traversing at least a portion of the fluid opening, the inner passage, the chamber, the valve member, and the valve seat may be non-magnetic, the probe body may comprise a fluid channel having a first fluid port and a second fluid port, such that, when the probe body is installed, the first fluid port is directly adjacent to the fluid opening of the chamber and the second port is external to the fluid system, the second fluid port of the fluid channel may comprise a connection for connecting to a fluid sampling device or a fluid drain, the probe body may comprise an end surface that engages the valve member when the probe is installed in the probe receiver, the probe body may comprise an end surface that engages the valve member when the probe is installed in the probe receiver and the first fluid port may be formed in a sidewall of the probe and adjacent to the end surface, the internal connections and external connections may be internal threads and external threads, the valve seat may be a ball seat and the valve member may be a ball, the chamber may comprise a spring opposite the valve seat relative to the valve member, the valve member moving along a direction that is aligned with an axis of the inner passage, the probe body may comprise a stopper section having an outer diameter that is substantially the same as the inner diameter of the inner passage, the stopper section being positioned within the inner passage as the external connection is released from the internal connection and until the valve member moves to the seated position.

According to an aspect, there is provided a method of accessing a fluid system, the fluid system having a sidewall that defines a fluid cavity, the method comprising the steps of installing a probe receiver through the sidewall of the fluid system, the probe receiver comprising an inner passage that extends through the outer connection, the inner passage having an internal connection at a first end and a valve seat at a second end, a chamber adjacent to the valve seat and in fluid communication with the inner passage, the chamber comprising a fluid opening that is in fluid communication with the fluid cavity of the fluid system, a valve member that is movable within the chamber between an unseated position away from the valve seat and a seated position against the valve seat, the valve member being biased toward the seated position, installing a probe in the probe receiver by sealably and releasably engaging an external connection of the probe to the internal connection of the probe receiver such that a probe body of the probe extends away from the external connection, through the inner fluid passage of the probe receiver, and into the chamber, wherein as the probe is installed in the probe receiver, causing the probe body to move the valve member from the seated position toward the unseated position such that the valve member and a portion of the probe body traverses at least a portion of the fluid opening.

In other aspects, the method may include one or more of the following aspects: the method may further comprise the step of removing the probe from the probe receiver such that the valve member moves to the seated position, the probe body may comprise a magnetic element, at least a portion of the magnetic element traversing at least a portion of the fluid opening as the probe is installed in the probe receiver, the inner passage, the chamber, the valve member, and the valve seat may be non-magnetic, the probe body may comprise a fluid channel having a first fluid port and a second fluid port, such that, when the probe body is installed, the first fluid port is directly adjacent to the fluid opening of the chamber and the second port is external to the fluid system, the second fluid port of the fluid channel may comprise a connection for connecting to a fluid sampling device or a fluid drain, the probe body may comprise an end surface that engages the valve member when the probe is installed in the probe receiver, the probe body may comprise an end surface that engages the valve member when the probe is installed in the probe receiver and the first fluid port is formed in a sidewall of the probe and adjacent to the end surface, the internal connections and external connections may be internal threads and external threads, the valve seat may be a ball seat and the valve member may be a ball, the chamber may comprise a spring opposite the valve seat relative to the valve member, the valve member moving along a direction that is aligned with an axis of the inner passage, and the probe body may comprise a stopper section having an outer diameter that is substantially the same as the inner diameter of the inner passage, the stopper section being positioned within the inner passage as the external connection is released from the internal connection and until the valve member moves to the seated position.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is a side elevation view in section of the access port with the test probe installed in the probe receiver.

FIG. 2 is a side elevation view in section of a test probe being withdrawn from the probe receiver.

FIG. 7 is a side elevation view of an alternative test probe.

FIG. 8 is a cross sectional view of the alternative test probe of FIG. 7, taken along the line A-A.

FIG. 17 is side elevation view of a fourth alternative test probe.

FIG. 18 is a side elevation view of a shorter version of the alternative test probe shown in FIG. 17.

FIG. 19 is a front elevation view of the alternative test probe of FIG. 17 and FIG. 18.

DETAILED DESCRIPTION

Figure 3:
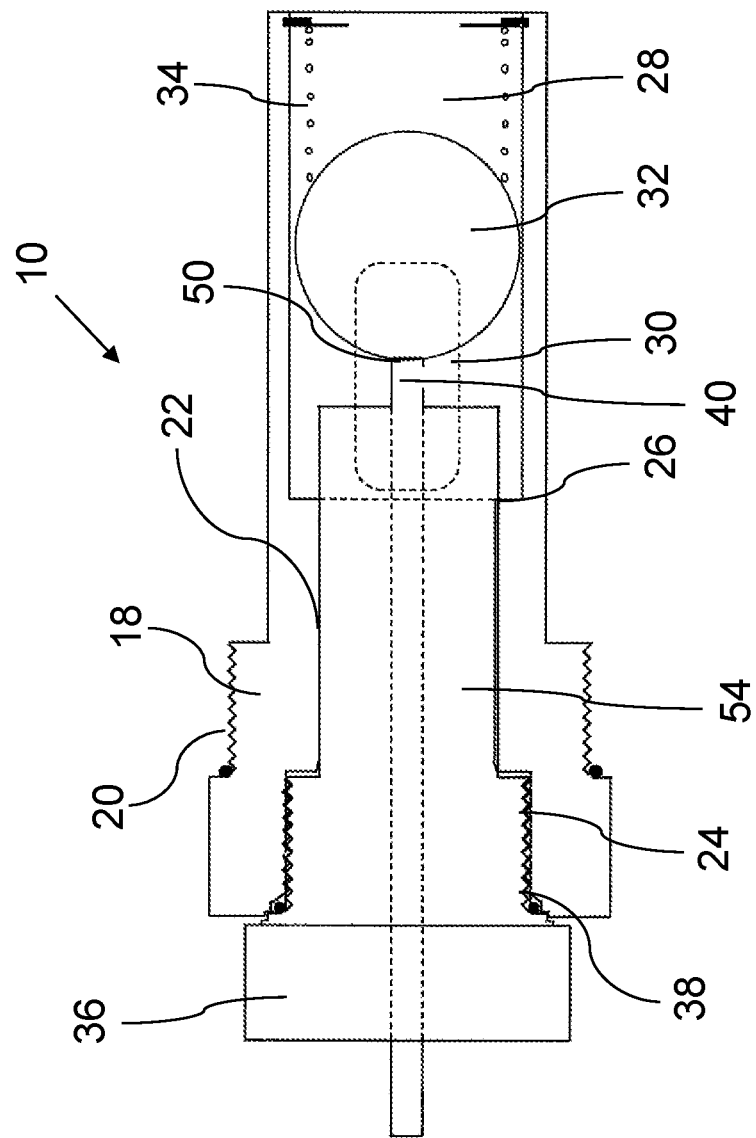
FIG. 3 is a side elevation view in section of a probe receiver with a fluid sampler installed in the probe receiver.
Figure 4:
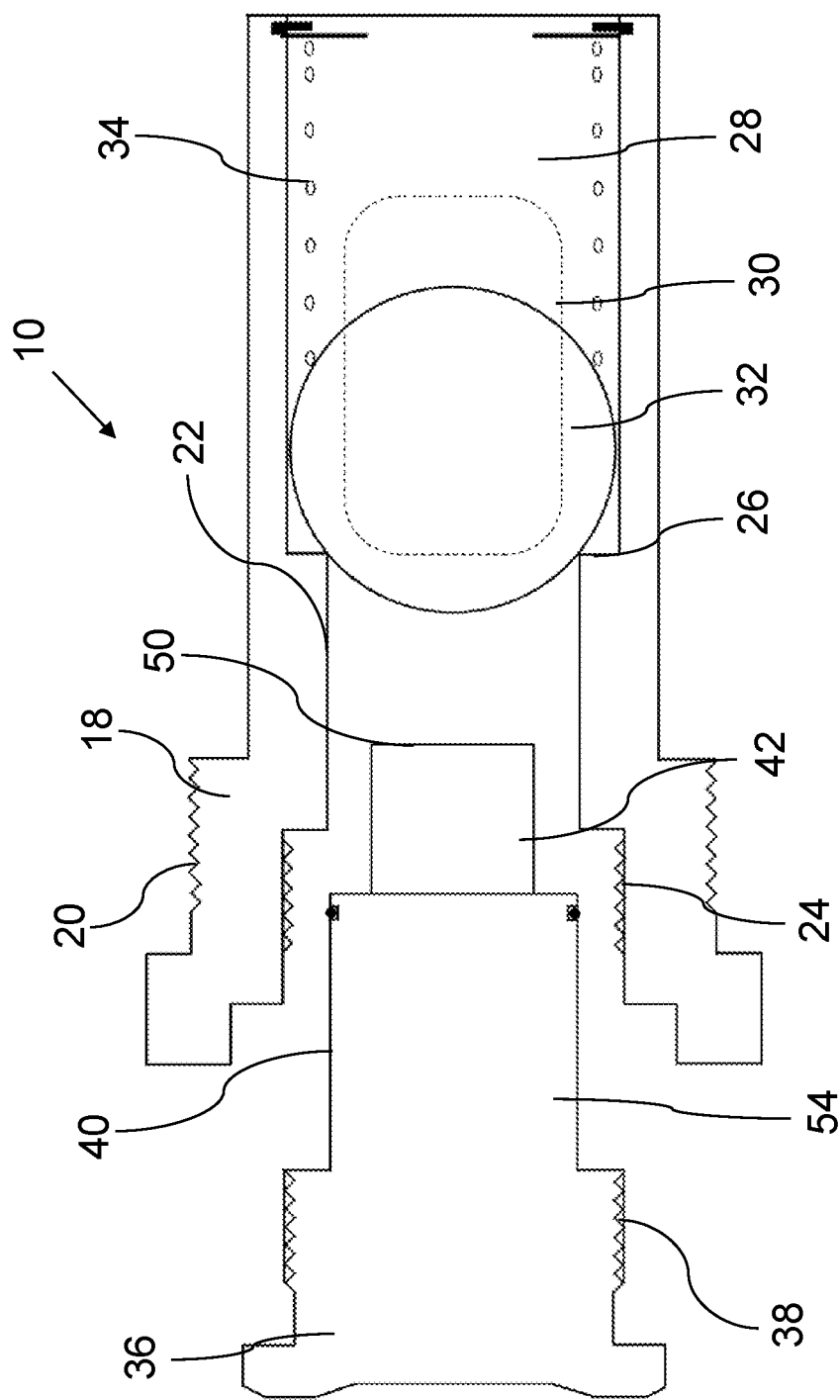
FIG. 4 is a side elevation view in section of an access port with a test probe being installed into the probe receiver.

An access port for a fluid system, generally identified by reference numeral 10, will now be described with reference to FIG. 1 through FIG. 19.

Figure 6:
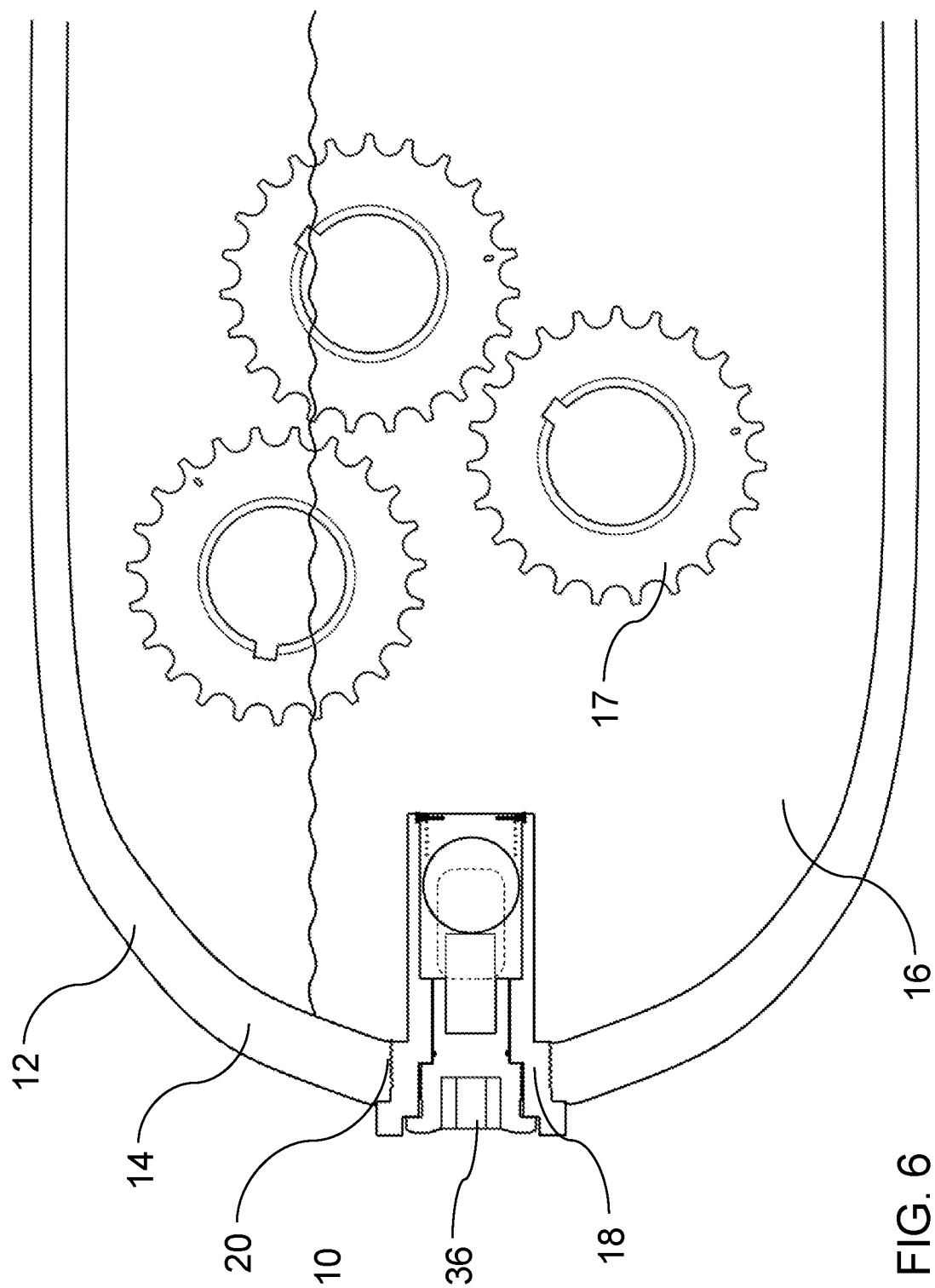
FIG. 6 is a side elevation view in section of a fluid system with an access port installed in the sidewall.
Figure 9:
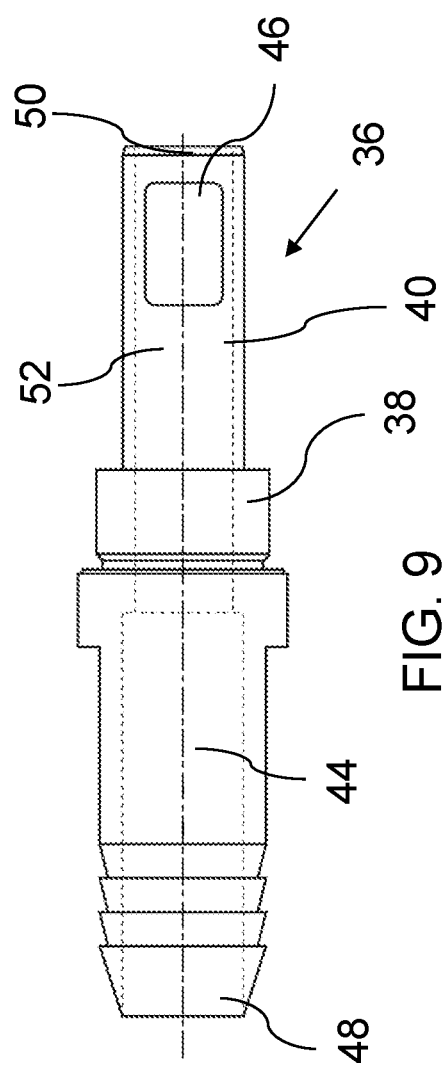
FIG. 9 is a side elevation view of a shorter version of the alternative test probe shown in FIG. 7.
Figure 10:
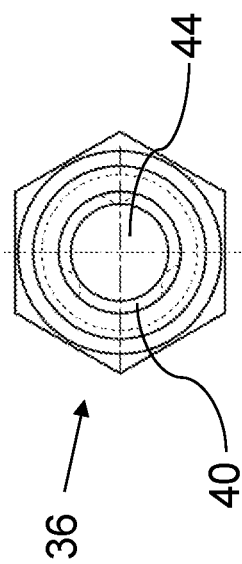
FIG. 10 is a front elevation view of the alternative test probe of FIG. 7 and FIG. 9.

Referring to FIG. 6, access port 10 is shown in the context of a fluid system 12, which has a sidewall 14 that defines a fluid cavity 16. Fluid system 12 is also shown with mechanical components 17, which are intended to represent various types of equipment that may interact with the fluid in fluid cavity 16. While fluid system 12 is depicted in FIG. 6 as a tank, fluid system 12 may be any known type of fluid system with a fluid container or component cavity 16, and is particularly designed for use in a fluid component as may be found in the hydraulic fluid system of industrial equipment, such as a fluid system that encloses a mechanical gearbox or other components. In particular, fluid systems 12 in which access port 10 may be used include moving parts made at least partly from ferrous materials, and for which the fluid in fluid cavity 16 acts as a lubricant and/or coolant. Access port 10 is used to help monitor equipment, where an excess of ferrous materials found by probe 10 may be indicative of a failure, or potential failure of mechanical components 17 within fluid system 10.

As can be see, access port 10 has a probe receiver 18 designed to be installed in sidewall 14 of fluid container 12 using an outer connection 20 that connects probe receiver 18 to sidewall 14 of the fluid system 12. As shown, the outer connection 20 of access port 10 may be provided with external threads that are designed to fit within an existing plug receiver in the sidewall 14 of the fluid system 12.

Figure 5:
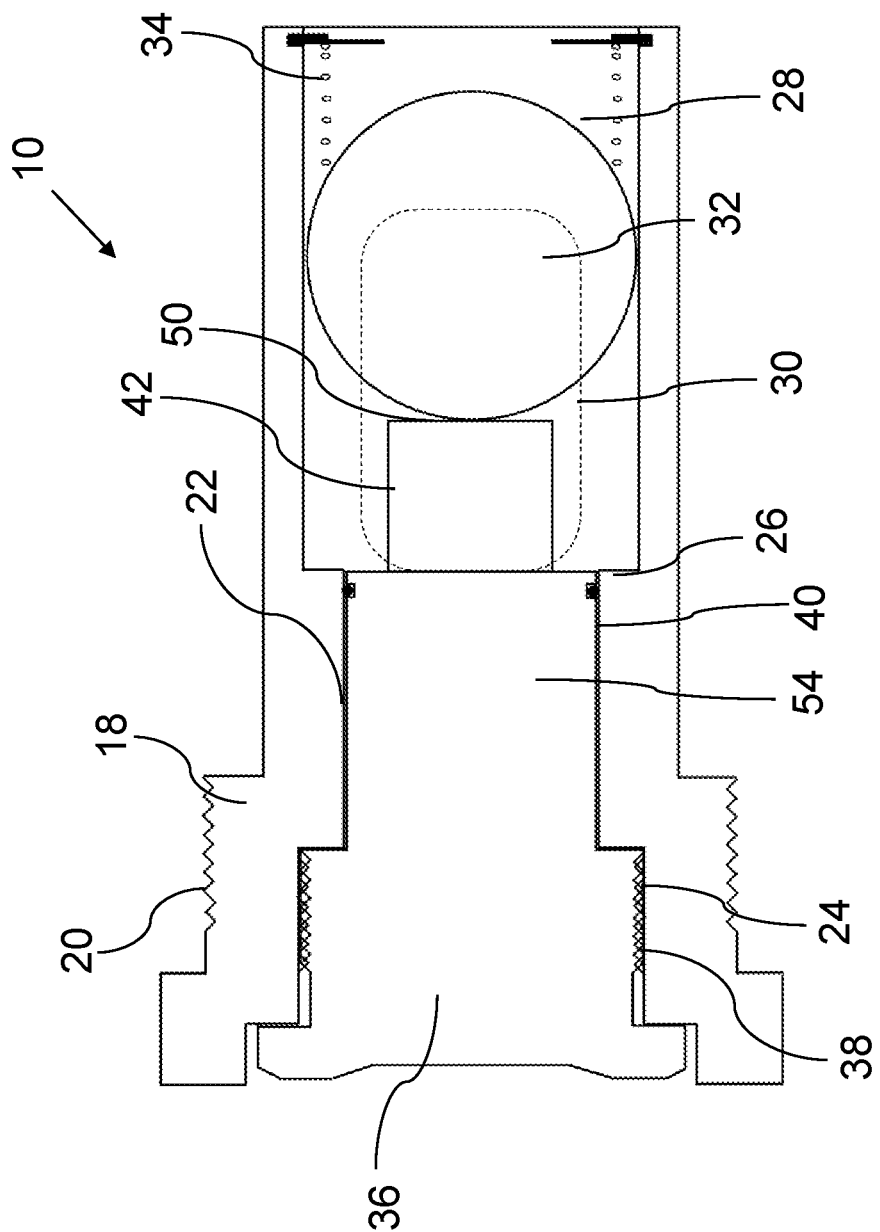
FIG. 5 is a side elevation view in section of the access port of FIG. 4 with the test probe installed into the probe receiver.

Referring to FIG. 1, probe receiver 18 has an inner passage 22 that extends through outer connection 20. Inner passage 22 has an internal connection 24 at a first end and a valve seat 10 26 at a second end. Probe receiver 18 has a chamber 28 adjacent to valve seat 26 that is in fluid communication with inner passage 22 when valve seat 26 is unsealed and is in fluid communication with fluid cavity 16 of fluid system 12 (shown in FIG. 6) via fluid openings 30. As can be seen, probe receiver 18 has a valve member 32 that controls fluid flow through valve seat 26. As can be seen, valve member 32 is movable within chamber 28 between an unseated 15 position away from valve seat 26 as shown in FIG. 1, such that chamber 28 is in fluid communication with inner passage 22, and a seated position against valve seat 26 as shown in FIG. 2, such that chamber 28 is sealed from inner passage 22 and space S. Valve member 32 is biased toward the seated position in which chamber 28 is isolated from inner passage 22. The biasing means may take various forms as is known in the art. In the depicted embodiment, valve seat 26 is a ball 20 seat and valve member 32 is a ball, and a spring 34 is provided within chamber 28 that biases ball 32 toward ball seat 26. As shown in FIG. 5, spring 34 may be opposite valve seat 26 relative to valve member 32, such that valve member 32 moves along a direction that is aligned with an axis of inner passage 22.

Access port 10 also has a probe 36 having an external connection 38 shaped to releasably and sealably engage internal connection 24 of probe receiver 18. Outer connection 20, internal connection 24, and external connection 38 may all be provided as threaded connections and may be internal threads and external threads respectively. Preferably, where engagement profiles 20, 24, and 38 are threaded couplings, the head of test probe 36 is a profile that can be engaged and rotated by a wrench to facilitate installation and removal, whether it be a commonly available wrench head, or a custom wrench head. Other connection types and actuators may also be used, as is known in the art. Probe 36 has a probe body 40 that extends away from external connection 38, and probe body 40 is sized to extend through inner fluid passage 22 of probe receiver 18 and into chamber 28. When probe body 40 is inserted into probe receiver 18, probe body 40 moves valve member 32 toward the unseated position as shown in FIG. 1, such that valve member 32 and a portion of probe body 40 traverses at least a portion of fluid opening 30. Probe body 40 may have an end surface 50 that engages valve member 32 when probe 36 is installed in probe receiver 18. When probe body 40 is removed from probe receiver 18, as shown in FIG. 2, valve member 32 moves to the seated position.

Figure 14:
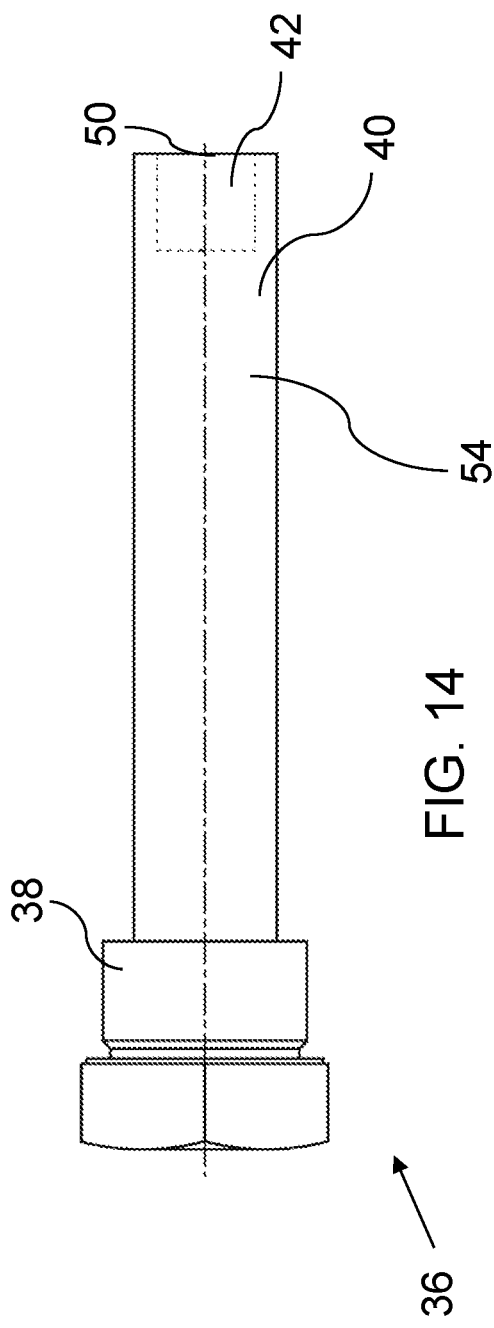
FIG. 14 is side elevation view of a third alternative test probe.
Figure 16:
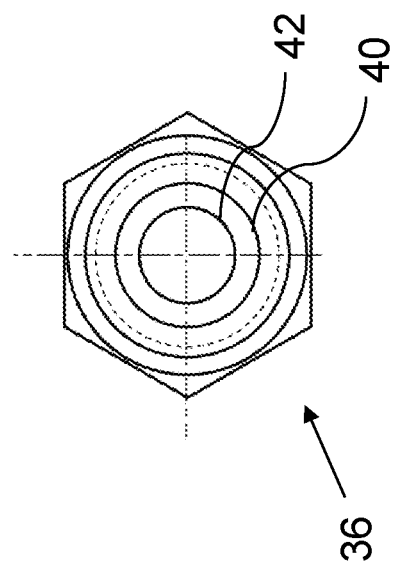
FIG. 16 is a front elevation view of the alternative test probe of FIG. 14 and FIG. 15.
Figure 15:
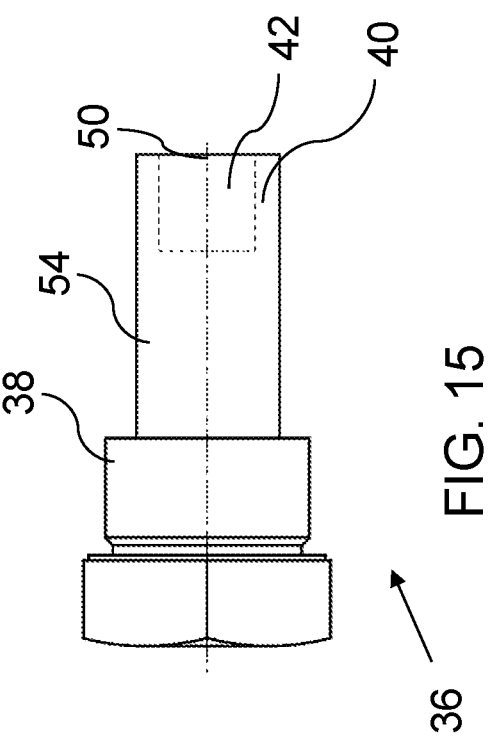
FIG. 15 is a side elevation view of a shorter version of the alternative test probe shown in FIG. 14.

Referring to FIG. 14 through FIG. 16, probe body 40 may carry or contain a magnetic element 42, and at least a portion of magnetic element 42 traverses at least a portion of fluid opening 30. Preferably, magnetic element 42 is a strong magnet, such as a rare earth metal, in order to attract and hold any metallic particles or chips that may be in the fluid, such that they may be observed by an operator when removing test probe 36. When the test probe 36 engages probe receiver 18, probe body 40 unseats valve member 32 from valve seat 26 and positions magnetic element 42 within fluid cavity 16. When test probe 36 is removed from probe receiver 18, probe body 40 permits valve member 32 to seat against valve seat 26 and seal inner passage 22. Opening 30 permits magnetic element 42 to directly interact with fluid in fluid cavity 16. When magnetic element 42 is provided, it is preferable that inner passage 22, chamber 28, and valve seat 26 are non-magnetic to facilitate the installation of the probe 36 into probe receiver 18. Otherwise, magnetic element 42 may be attracted to probe receiver 18 and make it difficult to insert the probe 36, and may magnetize probe receiver 18, which may affect the operation of access port 10.

Figure 11:
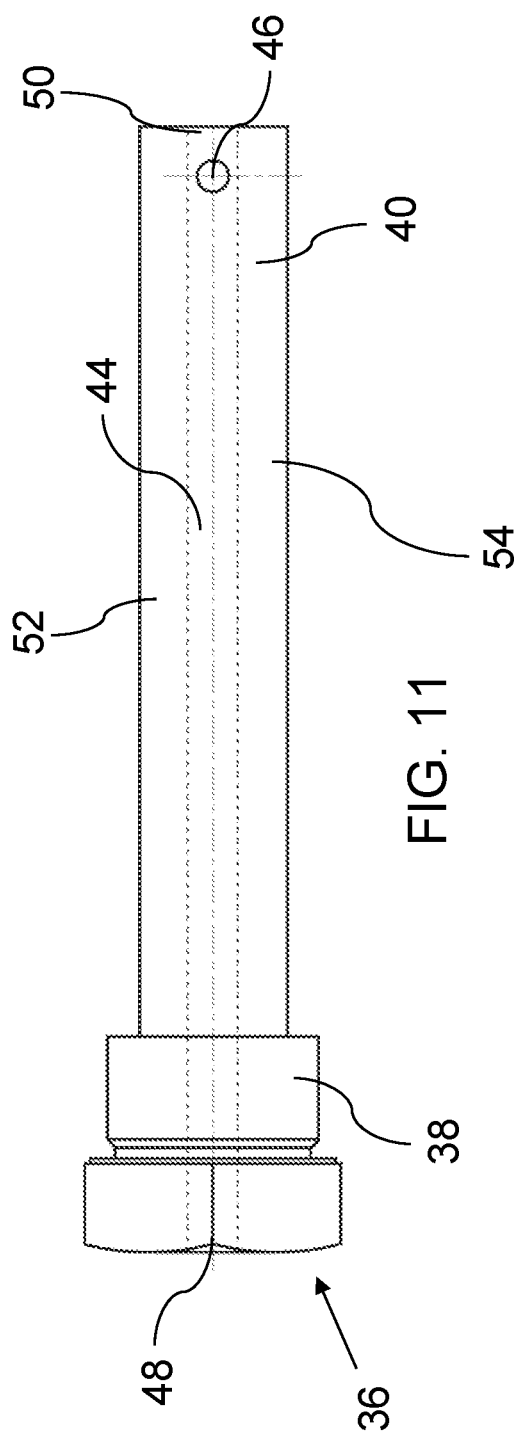
FIG. 11 is side elevation view of a second alternative test probe.
Figure 13:
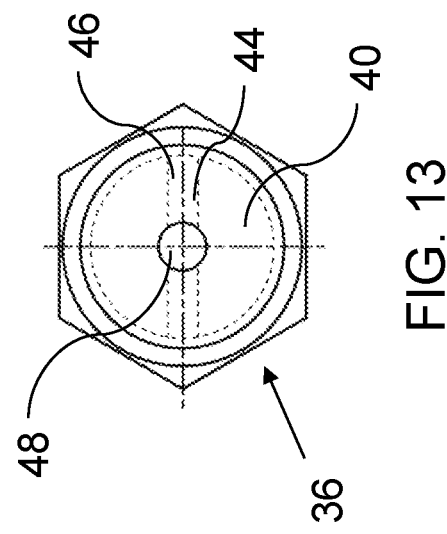
FIG. 13 is a front elevation view of the alternative test probe of FIG. 11 and FIG. 12.
Figure 12:
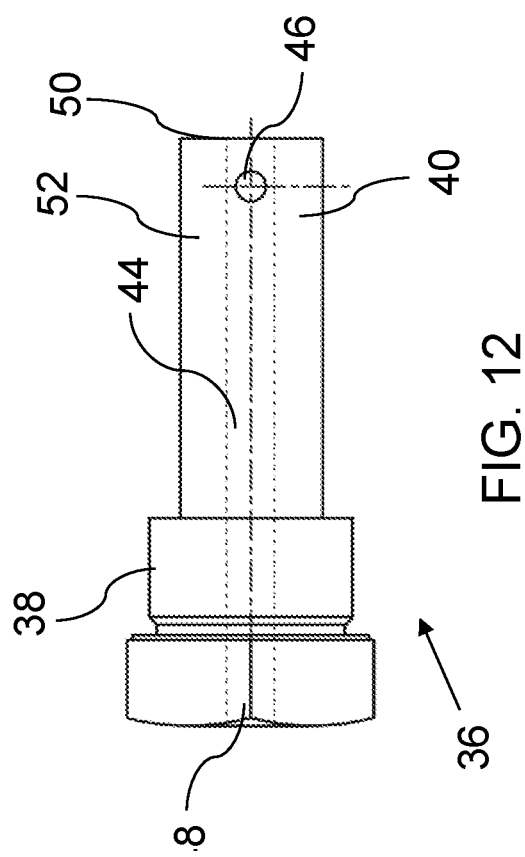
FIG. 12 is a side elevation view of a shorter version of the alternative test probe shown in FIG. 11.

Referring to FIG. 11 through FIG. 13, probe body 40 may have a fluid channel 44 with a first fluid port 46 and a second fluid port 48. When probe body 40 is installed in probe receiver 18, first fluid port 46 is directly adjacent to fluid opening 30 of chamber 28 and second fluid port 48 is external to fluid system 12. This creates a fluid path from within fluid system 12, via chamber 28, to the outside of fluid system 12. By providing fluid port 46 on the side of probe body 40 as shown, valve member 32 is less likely to interfere with the flow of fluid through fluid channel 44. Referring to FIG. 7 through FIG. 10, second fluid port 48 may have a connection for connecting to a fluid drain to allow fluid to be drained out of fluid system 12. Referring to FIG. 3 and FIG. 11 through FIG. 12, second fluid port 48 may also have a connection for connecting to a fluid sampling device. The fluid sampling device (not shown) may be connected to or inserted through probe 36 to remove a sample of fluid. Typically, the primary difference between fluid channel 44 acting as a fluid drain or a fluid sampling channel will be the flow area of fluid channel 44, and what is connected to fluid channel 44. to control flow, probe body 40 may have a valve, or a valve may be provided on the drain tube or fluid sampling device. Probe body 40 with fluid channel 44 may be used in conjunction with probe body 40 that does not have fluid channel 40, where probe body 40 without fluid channel 44 is removed and the other inserted for the purpose of draining or sampling fluid through probe body 40. Preferably, probe body 40 is non-magnetic Where probe body 40 is provided with end surface 50 that engages valve member 32 when probe 36 is installed in probe receiver 18, first fluid port 46 may be formed in a sidewall 52 of probe 36 adjacent to end surface 50, as shown in FIG. 11 through FIG. 13. Referring to FIG. 5, probe body 36 may have a stopper section 54 having an outer diameter that is substantially the same as the inner diameter of inner passage 22. Stopper section 54 is positioned within inner passage 22 as external connection 38 is released from internal connection 24 and until the valve member moves to the seated position to reduce the available flow.

In some examples, where valve actuator 40 may have a stopper section 54 that has an outer diameter that is substantially the same as the inner diameter of inner passage 22, such that it is able to block most of the fluid flow from within fluid cavity 28 as test probe 36 is being removed, magnetic element 42 may have a diameter that is smaller than stopper section 54 to avoid the unintentional removal of any metallic particles to being held by magnetic element 42 as probe 36 is being withdrawn from access port 18. Stopper section 54 may be positioned within inner passage 22 as external engagement profile 38 is released from internal engagement profile 24, and at least until valve actuator 40 permits valve member 32 to seat against valve seat 26 as test probe 36 is removed from probe receiver 18. As such, the amount of fluid that may leak out from cavity 28 is minimized, and may be further minimized by adjusting the relative dimensions of the various components.

A method of accessing fluid system 12 will now be described. Referring to FIG. 6, a probe receiver 18 is installed through sidewall 14 of fluid system 12, and a probe 36 is installed in probe receiver 18 by sealably and releasably engaging external connection 38 of probe 36 with internal connection 24 of probe receiver 18 such that probe body 40 of probe 36 extends away from external connection 38, through inner fluid passage 22 of probe receiver 18, and into chamber 28. As probe 36 is installed in probe receiver 18, probe body 40 is caused to move valve member 32 from the seated position (FIG. 4) toward the unseated position (FIG. 5) such that valve member 32 and a portion of probe body 40 traverses at least a portion of fluid opening 30. In order to return valve member 32 to the seated position, probe 36 may be removed from probe receiver 18. Where probe body 40 has a magnetic element 42, as shown in FIG. 14 through FIG. 16, at least a portion of magnetic elements traversing at least a portion of fluid opening 30 as probe 36 is installed in probe receiver 18.

While specific embodiments and alternatives have been described above, it will be understood by those of ordinary skill that the various aspects and elements may be combined in any reasonable combination.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. An access port for a fluid system, the fluid system having a sidewall that defines a fluid cavity, the access port comprising:
    a probe receiver comprising:
        an outer connector having an outer connection surface that, in use, connects the probe receiver to the sidewall of the fluid system;
        an inner passage that extends through the outer connector, the inner passage having an internal connection at a first end and a valve seat at a second end;
        a chamber adjacent to the valve seat, the chamber comprising a fluid opening adapted to be in fluid communication with the fluid cavity of the fluid system;
        a valve member that is movable within the chamber between an unseated position away from the valve seat and a seated position against the valve seat, the valve member being biased toward the seated position, wherein, in the unseated position, the chamber is in fluid communication with the inner passage via the valve seat, and in the seated position, the inner passage is sealed relative to the chamber;

a probe comprising:
an external connection shaped to sealably and releasably engage the internal connection of the probe receiver,
a probe body that extends away from the external connection, the probe body being sized to extend through the inner passage of the probe receiver and into the chamber, the probe body comprising a stopper section, the stopper section carrying a magnetic element at a remote end, the stopper section having an external diameter that is substantially the same as an inner diameter of the inner passage, and the magnetic element having a diameter that is less than the inner diameter of the inner passage;
wherein:
when the probe body is inserted into the probe receiver, the probe body moves the valve member toward the unseated position such that the valve member and at least a portion of the magnetic element traverse at least a portion of the fluid opening, and the remote end of the stopper section is immediately adjacent to the valve seat; and
as the probe body is being removed from the probe receiver, the valve member moves to the seated position such that a surface of the magnetic element, the valve member, the stopper section of the probe body and the inner diameter of the inner passage of the probe receiver together define a space within the inner passage adapted to receive ferrous particles carried by the magnetic element.

2. The access port of claim 1, wherein the inner passage, the chamber, the valve member, and the valve seat are non-magnetic.

3. The access port of claim 1, wherein the probe body comprises an end surface that engages the valve member when the probe is installed in the probe receiver.

4. The access port of claim 1, wherein the internal connection and external connection are internal threads and external threads.

5. The access port of claim 1, wherein the valve seat is a ball seat and the valve member is a ball.

6. The access port of claim 5, wherein the valve seat comprises a 90-degree corner that engages the ball.

7. The access port of claim 1, wherein the chamber comprises a spring opposite the valve seat relative to the valve member, the valve member moving along a direction that is aligned with an axis of the inner passage.

8. The access port of claim 1, wherein the stopper section has an outer diameter that is substantially the same as an inner diameter of the inner passage, the stopper section being positioned within the inner passage as the external connection is released from the internal connection and until the valve member moves to the seated position.

* * * * *